(12) United States Patent
Gao et al.

(10) Patent No.: US 9,882,385 B2
(45) Date of Patent: Jan. 30, 2018

(54) SYSTEM FOR STARTING LARGE-SCALE POWER LOAD IN MICRO-GRID

(71) Applicants: STATE GRID CORPORATION OF CHINA, Beijing (CN); STATE GRID HEBEI ELECTRIC POWER RESEARCH INSTITUTE, Hebei (CN); HEBEI ELECTRIC POWER COMMISSIONING INSTITUTE, Hebei (CN)

(72) Inventors: Zhiqiang Gao, Hebei (CN); Liang Meng, Hebei (CN); Wenping Hu, Hebei (CN); Wenxin Wang, Hebei (CN); Hui Fan, Hebei (CN); Hao Jing, Hebei (CN); Bin Liang, Hebei (CN)

(73) Assignees: STATE GRID HEBEI ELECTRIC POWER RESEARCH INSTITUTE (CN); HEBEI ELECTRIC POWER COMMISSIONING INSTITUTE (CN); STATE GRID CORPORATION OF CHINA (CN)

( * ) Notice: Subject to any disclaimer, the term of this patent is extended or adjusted under 35 U.S.C. 154(b) by 89 days.

(21) Appl. No.: 15/038,714

(22) PCT Filed: Jun. 24, 2014

(86) PCT No.: PCT/CN2014/080580
§ 371 (c)(1),
(2) Date: May 23, 2016

(87) PCT Pub. No.: WO2015/074417
PCT Pub. Date: May 28, 2015

(65) Prior Publication Data
US 2016/0294187 A1 Oct. 6, 2016

(30) Foreign Application Priority Data

Nov. 22, 2013 (CN) .......................... 2013 1 0592340

(51) Int. Cl.
H02J 1/00 (2006.01)
H02J 3/01 (2006.01)
(Continued)

(52) U.S. Cl.
CPC ................. *H02J 3/01* (2013.01); *H02J 3/32* (2013.01); *H02J 3/381* (2013.01); *H02M 1/12* (2013.01);
(Continued)

(58) Field of Classification Search
CPC ................. H02J 3/01; H02J 3/32; H02J 3/381
(Continued)

(56) References Cited

U.S. PATENT DOCUMENTS

2012/0267952 A1* 10/2012 Ballatine ................. H02J 1/102
307/26

FOREIGN PATENT DOCUMENTS

| CN | 103050995 | 4/2013 | ................ H02J 3/01 |
| CN | 103078325 | 5/2013 | ................ H02J 3/02 |

(Continued)

OTHER PUBLICATIONS

International Search Report and Written Opinion issued in application No. PCT/CN2014/080580, dated Sep. 23, 2014 (18 pgs).
(Continued)

*Primary Examiner* — Alfonso Perez Borroto
(74) *Attorney, Agent, or Firm* — Hayes Soloway P.C.

(57) ABSTRACT

A system for staring a large-scale power load in a micro grid comprises a PCC grid connection switch, a micro grid alternating-current bus, an active power filter (APF), an energy storage inverter, an energy storage battery, a current-limiting resistor R, contactors K1-K3, a time relay KT, a power supply relay board, a micro grid maser control system, a frequency converter rectifying circuit, a frequency converter filter circuit, and a frequency converter inverter circuit. There are the advantages: an output torque of a
(Continued)

power load can be effectively improved by using a variable frequency starting apparatus, and a starting current is also small; the provided method can effectively reduce a harmonic current when a variable frequency starting apparatus starts a power load, the phenomenon that two power sources supply power on a direct-current side of the variable frequency starting apparatus at the same time is avoided, thereby improving the stability and the economy of a micro grid.

16 Claims, 4 Drawing Sheets

(51) Int. Cl.
H02J 3/32 (2006.01)
H02J 3/38 (2006.01)
H02M 1/12 (2006.01)
H02M 7/04 (2006.01)
H02M 7/44 (2006.01)

(52) U.S. Cl.
CPC ............... *H02M 7/04* (2013.01); *H02M 7/44* (2013.01); *Y02E 40/22* (2013.01); *Y02P 80/14* (2015.11); *Y02P 80/152* (2015.11)

(58) Field of Classification Search
USPC .......................................................... 307/72
See application file for complete search history.

(56) References Cited

FOREIGN PATENT DOCUMENTS

| CN | 103151799 | 6/2013 | ................ H02J 3/32 |
| CN | 103560544 | 2/2014 | ................ H02J 3/01 |
| CN | 203617707 | 5/2014 | ................ H02J 3/00 |
| TW | 201318297 | 5/2013 | ............. H02J 15/00 |

OTHER PUBLICATIONS

International Preliminary Report on Patentability issued in application No. PCT/CN2014/080580, dated May 24, 2016 (12 pgs).

* cited by examiner

US 9,882,385 B2

SYSTEM FOR STARTING LARGE-SCALE POWER LOAD IN MICRO-GRID

TECHNICAL FIELD

The present invention belongs to the technical field of distributed generation, power storage, power quality and micro-grid technology, and relates to a system for starting a large-scale power load in a micro-grid.

BACKGROUND ART

Along with the development of the economy and the society in China, more and more resources are consumed, thus a huge pressure is put on the environment. To solve that problem, distributed power sources, mainly renewable energy resources, are being developed vigorously in China. As many distributed power sources are grid-connected, the electric grid suffers impacts. Micro-grids can solve the problems related with grid connection of distributed power sources satisfactorily. However, when a micro-grid operates offline, as the system has small capacity and poor harmonic current endurance capacity, when offline micro-grid starts a large-scale power load, the surge current and harmonic current produced may result in abnormal situation in the system. In order to effectively improve the economic efficiency of micro-grid, it is urgent to develop a method for starting a large-scale power load in a low-capacity micro-grid during offline operation of the micro-grid.

Among the methods for starting a large-scale power load, in the voltage soft start method, a voltage soft starter is utilized, but the starting current is high, and the harmonic current is severe; in addition, during the startup process, the output torque of the large-scale power load is small. Utilizing a variable frequency starter can effectively improve the output torque of the power load and greatly reduce the starting current. However, owing to the fact that a variable frequency starter has an internal rectifier circuit, the harmonic current is high when such a variable frequency starter is used. Since a micro-grid has low capacity and low harmonic current endurance capacity, the harmonic current produced when a power load is started with a variable frequency starter may influence the stability of the micro-grid.

CONTENTS OF THE INVENTION

The technical problem to be solved in the present invention is to provide a system for starting a large-scale power load in a low-capacity micro-grid under offline operation, which can effectively reduce the harmonic current.

To solve the above-mentioned technical problem, the present invention employs the following technical scheme: a system for starting a large-scale power load in a micro-grid, comprising a PCC (point of common coupling) grid-connection switch, a micro-grid AC bus, an active power filter (APF), a battery storage inverter, an energy storage battery, a current-limiting resistor R, contactors K1-K3, a time relay KT, a power relay board, a micro-grid main control system, a rectifier circuit of converter, a filter circuit of converter, and an inverter circuit of converter, wherein, the micro-grid AC bus is bi-directionally connected with a bulk grid through the PCC grid-connection switch; the active power filter (APF) is bi-directionally connected with the micro-grid AC bus;
the energy storage battery comprises two branches, wherein one branch is bi-directionally connected with the micro-grid AC bus through the battery storage inverter, and the other branch is connected to the input terminal of the filter circuit of converter through main contact pins 1 and 2 of the contactor K3 and main contact pins 1 and 2 of the contactor K1 sequentially; the current-limiting resistor R is connected in parallel with main contact pins 1 and 2 of the contactor K1;

the micro-grid AC bus is connected to the large-scale power load through the rectifier circuit of converter, main contact pins 1 and 2 of the contactor K2, the filter circuit of converter, and the inverter circuit of converter sequentially;

a first control output terminal and a second control output terminal of the micro-grid main control system are connected to a first control input terminal I1 and a second control input terminal I2 of the power relay board respectively;

a first power output terminal E1-1 of the power relay board is connected to a common output terminal E1-01 of the power relay board through power supply coil terminals A1 and A2 of the contactor K3 and normally closed auxiliary contact pins 5 and 6 of the contactor K2 sequentially;

a second power output terminal E1-2 of the power relay board is connected to the common output terminal E1-01 of the power relay board through power supply coil terminals A1 and A2 of the contactor K2, normally closed auxiliary contact pins 5 and 6 of the contactor K3, and normally closed auxiliary contact pins 5 and 6 of the contactor K1 sequentially;

a third power output terminal E1-3 of the power relay board is connected to the common output terminal E1-01 of the power relay board through power terminal pins 1 and 2 of the time relay KT and normally open auxiliary contact pins 7 and 8 of the contactor K3 sequentially;

a fourth power output terminal E1-4 of the power relay board is connected to the common output terminal E1-01 of the power relay board through power supply coil terminals A1 and A2 of the contactor K1 and normally open contact pins 3 and 4 of the time relay KT sequentially;

The power relay board comprises resistors R1-R2, photoelectric couplers OC1-OC2, relays J4-J5, DC power sources DC1-DC2, and AC power source E1;

the first input control terminal I1 of the power relay board is connected to the positive electrode pin 1 of an LED of the photoelectric coupler OC1 through the resistor R1; the negative electrode pin 2 of the LED of the photoelectric coupler OC1 is grounded; a collecting electrode pin 4 of the photoelectric coupler OC1 is connected to the positive electrode of a coil J4-1 of the relay J4, and an emitting electrode pin 3 of the photoelectric coupler OC1 is connected to the negative electrode of the coil J4-1 of the relay J4 through the DC power source DC1; a normally open stationary contact of the relay J4 is connected to the first power output terminal E1-1 of the power relay board, and a normally open moving contact of the relay J4 is connected to a terminal E1-02 of the AC power source E1;

the second input control terminal I2 of the power relay board is connected to the positive electrode pin 1 of an LED of the photoelectric coupler OC2 through the resistor R2; the negative electrode pin 2 of the LED of the photoelectric coupler OC2 is grounded; a collecting electrode pin 4 of the photoelectric coupler OC2 is connected to the positive electrode of a coil J5-1 of the relay J5, and an emitting electrode pin 3 of the photoelectric coupler OC2 is connected to the negative electrode of the coil J5-1 of the relay J5 through the DC power source DC2; a normally open stationary contact of the relay J5 is connected to the second power output terminal E1-2 of the power relay board, and a normally open moving contact of the relay J5 is connected to the terminal E1-02 of the AC power source E1;

the third power output terminal E1-3 of the power relay board and the fourth power output terminal E1-4 of the power relay board are connected to the terminal E1-02 of the AC power source E1 respectively; the terminal E1-01 of the AC power source E1 is the common output terminal E1-01 of the power relay board.

Both of the photoelectric couplers OC1-OC2 are of model TLP521-1; both of the relays J4-J5 are of model MY2NJ-12 VDC.

The rectifier circuit of converter is a three-phase full-wave bridge circuit composed of rectifier diodes D1-D6.

All of the rectifier diodes D1-D6 are of model SKD110/12E.

The filter circuit of converter is a LC filter circuit composed of an inductor L and a capacitor C. The inverter circuit of converter is a three-phase full-bridge inverter circuit composed of IGBT modules Q1-Q6 and diodes D7-D12; the power storage inverter is a three-phase full-bridge inverter circuit composed of IGBT modules Q7-Q12 and diodes D13-D18.

All of the IGBT modules Q1-Q12 are of model FS450R12KE3 from Infineon.

The time relay KT is of model JS14P from Chint; the micro-grid main control system is of model NMC1000; the PCC grid-connection switch is of model MG2312; the active power filter (APF) is of model SPA3-100A/0.4.

The voltage of the DC power sources DC1-DC2 is 12V; the voltage of the AC power source E1 is 24V.

The beneficial effects obtained from the above-mentioned technical scheme include: with a variable frequency starter, the output torque of the power load can be effectively improved, and the starting current is low; in addition, the method disclosed in the present invention can effectively reduce the harmonic current produced when the power load is started with the variable frequency starter, avoid a phenomenon that two power supplies supply power at the same time at the DC side of the variable frequency starter, and improve the stability and economic efficiency of the micro-grid.

Embodiments

Figure 1:
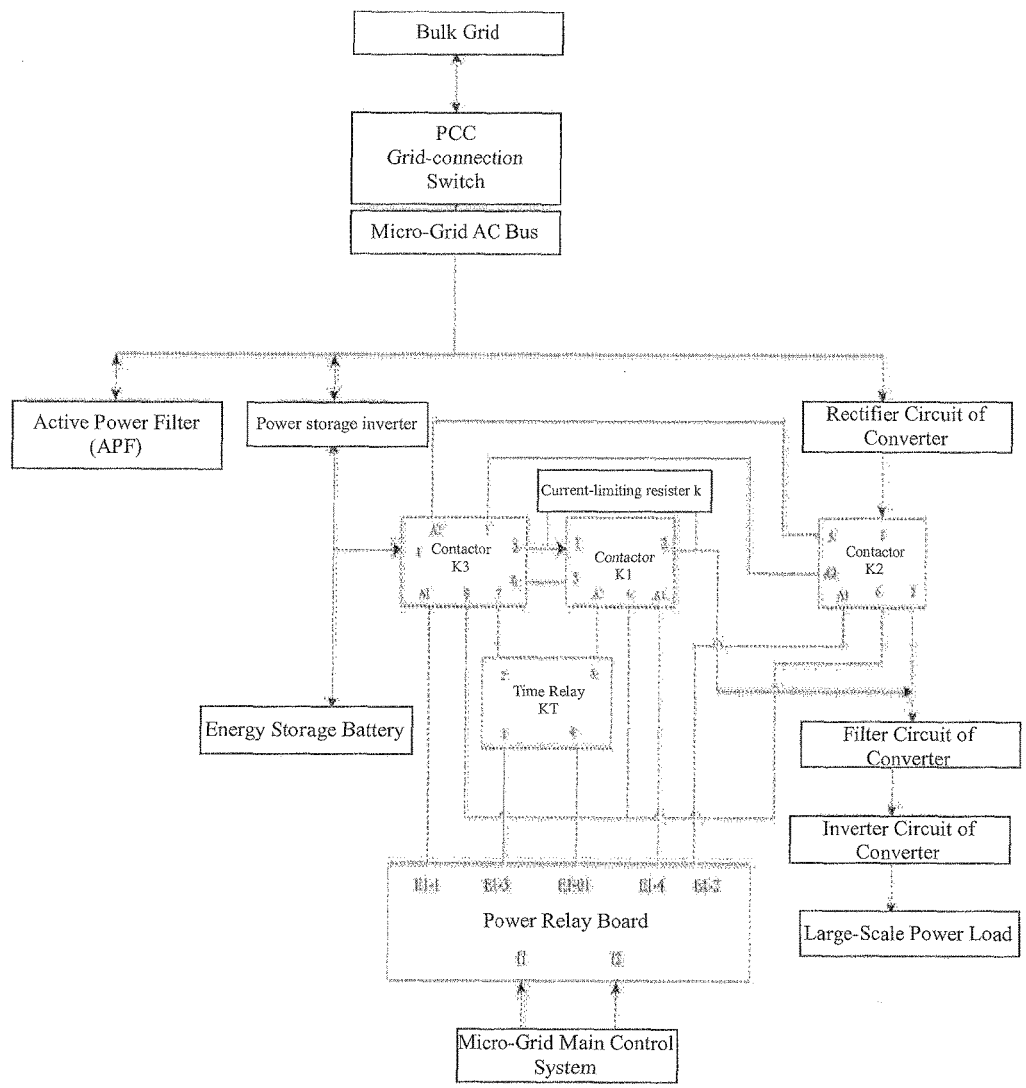
FIG. 1 is a functional block diagram of the system disclosed in the present invention.
Figure 2:
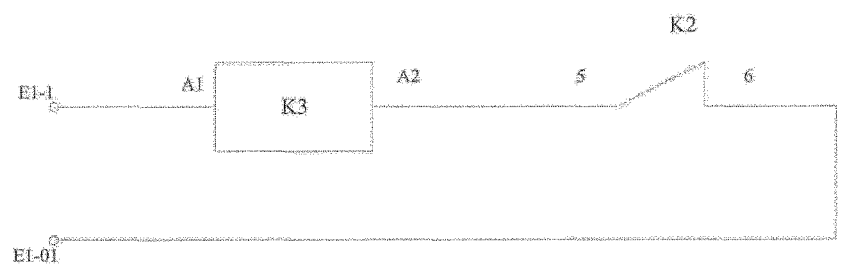
FIG. 2 is a connection diagram between the power supply coil of K3 and the normally closed auxiliary contacts of K2 in the present invention.
Figure 3:
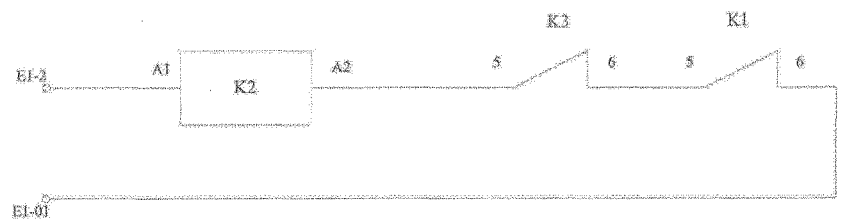
FIG. 3 is a connection diagram between the power supply coil of K2 and the normally closed auxiliary contacts of K3 and K1 in the present invention.
Figure 4:
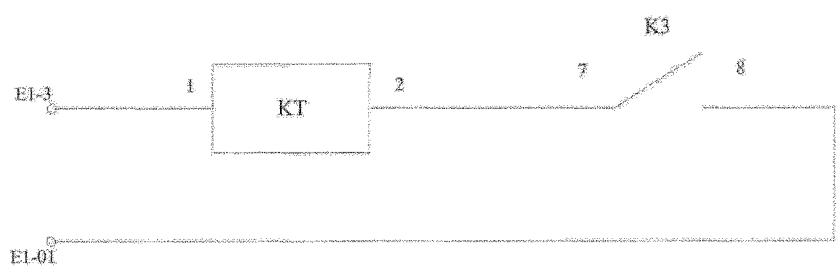
FIG. 4 is a connection diagram between the power terminal of the time relay KT and the normally open auxiliary contacts of K3 in the present invention.
Figure 5:
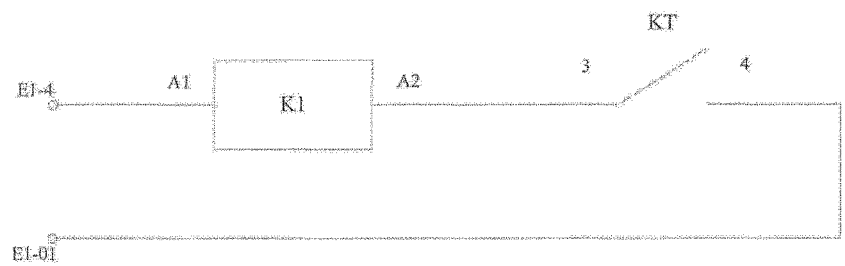
FIG. 5 is a connection diagram between the power supply coil of K1 and the normally open contacts of the time relay KT in the present invention.
Figure 6:
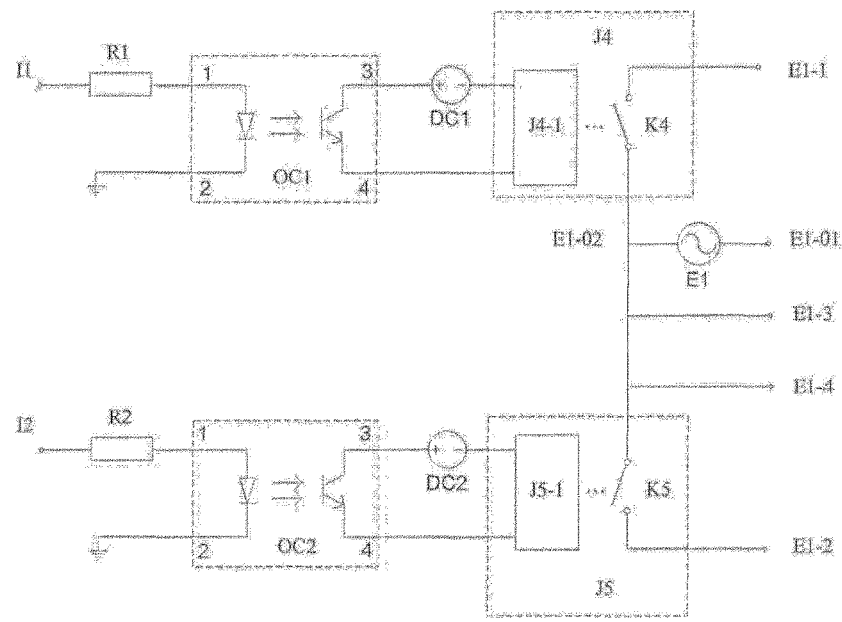
FIG. 6 is a schematic circuit diagram of the power relay board in the present invention.
Figure 7:
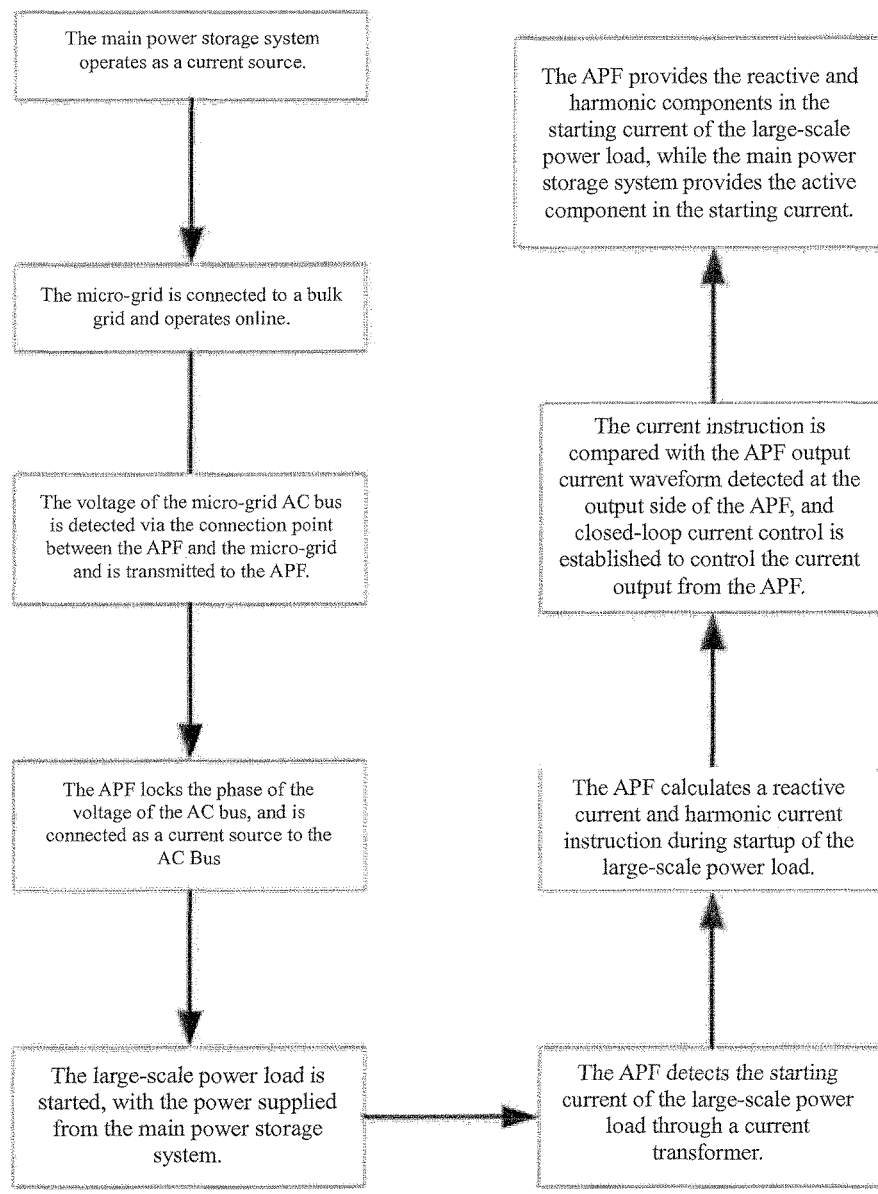
FIG. 7 shows the starting process of a large-scale power load when the system disclosed in the present invention operates online.

It can be seen from the examples shown in FIGS. 1-7: the example comprises a PCC grid-connection switch, a micro-grid AC bus, an active power filter (APF), a battery storage inverter, an energy storage battery, a current-limiting resistor R, contactors K1-K3, a time relay KT, a power relay board, a micro-grid main control system, a rectifier circuit of converter, a filter circuit of converter, and an inverter circuit of converter, the micro-grid AC bus is bi-directionally connected with a bulk grid through the PCC grid-connection switch; the active power filter (APF) is bi-directionally connected with the micro-grid AC bus;

the energy storage battery comprises two branches, wherein one branch is bi-directionally connected with the micro-grid AC bus through the battery storage inverter, and the other branch is connected to the input terminal of the filter circuit of converter through main contact pins 1 and 2 of the contactor K3 and main contact pins 1 and 2 of the contactor K1 sequentially; the current-limiting resistor R is connected in parallel with main contact pins 1 and 2 of the contactor K1;

the micro-grid AC bus is connected to the large-scale power load through the rectifier circuit of converter, main contact pins 1 and 2 of the contactor K2, the filter circuit of converter, and the inverter circuit of converter sequentially;

a first control output terminal and a second control output terminal of the micro-grid main control system are connected to a first control input terminal I1 and a second control input terminal I2 of the power relay board respectively;

a first power output terminal E1-1 of the power relay board is connected to a common output terminal E1-01 of the power relay board through power supply coil terminals A1 and A2 of the contactor K3 and normally closed auxiliary contact pins 5 and 6 of the contactor K2 sequentially;

a second power output terminal E1-2 of the power relay board is connected to the common output terminal E1-01 of the power relay board through power supply coil terminals A1 and A2 of the contactor K2, normally closed auxiliary contact pins 5 and 6 of the contactor K3, and normally closed auxiliary contact pins 5 and 6 of the contactor K1 sequentially;

a third power output terminal E1-3 of the power relay board is connected to the common output terminal E1-01 of the power relay board through power terminal pins 1 and 2 of the time relay KT and normally open auxiliary contact pins 7 and 8 of the contactor K3 sequentially;

a fourth power output terminal E1-4 of the power relay board is connected to the common output terminal E1-01 of the power relay board through power supply coil terminals A1 and A2 of the contactor K1 and normally open contact pins 3 and 4 of the time relay KT sequentially;

The power relay board comprises resistors R1-R2, photoelectric couplers OC1-OC2, relays J4-J5, DC power sources DC1-DC2, and AC power source E1;

the first input control terminal I1 of the power relay board is connected to the positive electrode pin 1 of an LED of the photoelectric coupler OC1 through the resistor R1; the negative electrode pin 2 of the LED of the photoelectric coupler OC1 is grounded; a collecting electrode pin 4 of the photoelectric coupler OC1 is connected to the positive electrode of a coil J4-1 of the relay J4, and an emitting electrode pin 3 of the photoelectric coupler OC1 is connected to the negative electrode of the coil J4-1 of the relay J4 through the DC power source DC1; a normally open stationary contact of the relay J4 is connected to the first power output terminal E1-1 of the power relay board, and a normally open moving contact of the relay J4 is connected to a terminal E1-02 of the AC power source E1;

the second input control terminal I2 of the power relay board is connected to the positive electrode pin 1 of an LED of the photoelectric coupler OC2 through the resistor R2; the negative electrode pin 2 of the LED of the photoelectric coupler OC2 is grounded; a collecting electrode pin 4 of the photoelectric coupler OC2 is connected to the positive electrode of a coil J5-1 of the relay J5, and an emitting electrode pin 3 of the photoelectric coupler OC2 is connected to the negative electrode of the coil J5-1 of the relay J5 through the DC power source DC2; a normally open stationary contact of the relay J5 is connected to the second power output terminal E1-2 of the power relay board, and a normally open moving contact of the relay 15 is connected to the terminal E1-02 of the AC power source E1;

the third power output terminal E1-3 of the power relay board and the fourth power output terminal E1-4 of the power relay board are connected to the terminal E1-02 of the AC power source E1 respectively; the terminal E1-01 of the AC power source E1 is the common output terminal E1-01 of the power relay board.

Both of the photoelectric couplers OC1-OC2 are of model TLP521-1; both of the relays J4-J5 are of model MY2NJ-12 VDC.

The rectifier circuit of converter is a three-phase full-wave bridge circuit composed of rectifier diodes D1-D6.

All of the rectifier diodes D1-D6 are of model SKD110/12E.

The filter circuit of converter is a LC filter circuit composed of an inductor L and a capacitor C. The inverter circuit of converter is a three-phase full-bridge inverter circuit composed of IGBT modules Q1-Q6 and diodes D7-D12; the power storage inverter is a three-phase full-bridge inverter circuit composed of IGBT modules Q7-Q12 and diodes D13-D18.

All of the IGBT modules Q1-Q12 are of model FS450R12KE3 from Infineon.

The time relay KT is of model JS14P from Chint; the micro-grid main control system is of model NMC1000; the PCC grid-connection switch is of model MG2312; the active power filter (APF) is of model SPA3-100A/0.4.

The DC power sources DC1-DC2 and the AC power source E1 are at appropriate voltage levels, wherein, the voltage of the DC power sources DC1-DC2 is 12V; the voltage of the AC power source E1 is 24V.

The diodes D7-D12 in the three-phase full-bridge inverter circuit match the IGBT modules Q1-Q6 in the three-phase full-bridge inverter circuit; the diodes D13-D18 in the power storage inverter match the IGBT modules Q7-Q12 in the power storage inverter.

The inductor L and the capacitor C in the LC filter circuit match the rectifier circuit of converter and the inverter circuit of converter.

The contactors K1, K2 and K3 are DC contactors, and their voltage and current levels are corresponding to each other; the contactors K1, K2 and K3 are optionally DC contactors with normally open/normally closed auxiliary contacts in an appropriate amount.

In FIGS. 2-5, A1 and A2 are power supply coils of contactors K1, K2 and K3; after A1 and A2 are powered on, the main contact pins 1 and 2 of the contactor will be closed; the pins 1 and 2 of contactors K1, K2 and K3 are main contacts, and can endure large current; the pins 5, 6, 7 and 8 of contactors K1, K2 and K3 are auxiliary contacts, wherein, the pins 5 and 6 are normally closed contacts, i.e., they are kept in a closed state when the contactor is not powered on, and they are opened after the contactor is powered on; the pins 7 and 8 are normally open contacts, i.e., they are kept in an open state when the contactor is not powered on, and are closed after the contactor is powered on. The pins 1 and 2 of the time relay KT are power terminals, and the pins 3 and 4 of the time relay KT are normally open contacts; once the pins 1 and 2 of the time relay KT are powered on, the time relay KT will start timing; once the timing of the time relay KT reaches the preset time, the normally open contacts pins 3 and 4 of the time relay KT will be closed. After the contactor K3 is closed, the normally open contact pins 7 and 8 of K3 will be closed, and thereby power will be supplied to the power terminal pins 1 and 2 of the time relay KT. Once the power on time of the time relay KT reaches the preset time, the normally open contact pins 3 and 4 of the time relay KT will be closed, and thereby the power supply coils A1 and A2 of the contactor K1 will be powered on, and the main contact pins 1 and 2 of the contactor K1 will be closed.

The working process of the system disclosed in the present invention is as follows: first, the operating state of the micro-grid is detected; when the PCC grid-connection switch of the micro-grid is in OFF state, the micro-grid operates offline; when the PCC grid-connection switch of the micro-grid is in ON state, the micro-grid operates online.

When the micro-grid operates offline, the voltage and frequency of the micro-grid is provided by the power storage inverter; at this time, the capacity of the micro-grid is low, and the harmonic current tolerance capacity of the micro-grid is also low. If a large-scale power load is directly started with a variable frequency starter (the variable frequency starter comprises a rectifier circuit of converter, a filter circuit of converter, and an inverter circuit of converter), the content of characteristic harmonics (e.g., fifth harmonics and seventh harmonics, etc.) in the micro-grid will be high, resulting severe impacts on the stability of the micro-grid. In addition, since the backward stage of the variable frequency starter outputs a voltage waveform with ever-changing amplitude and frequency, the harmonic content in the micro-grid will change continuously. Though the harmonic current in the micro-grid can be compensated dynamically with power quality control devices such as an active power filter (APF), at least half power frequency cycle is required for an active power filter (APF) to establish a stable output; consequently, the harmonic current content in that half power frequency cycle in the micro-grid is high, and also has impacts on the stability of the micro-grid.

In order to effectively solve that problem, the micro-grid main control system issues a control signal to the power relay board, so that the main contact pins 1 and 2 of the contactor K2 are opened, the power relay board charges the power terminal pins 1 and 2 of the time relay KT and charges the power supply coil terminals A1 and A2 of the contactor K3, the main contact pins 1 and 2 of the contactor K3 are closed, and the auxiliary normally open contact pins 7 and 8 of the contactor K3 are closed. Now, the power storage battery supplies power to the filter circuit of converter through the current-limiting resistor R. After the normally open contact pins 3 and 4 of the time relay KT are closed, the power relay board charges the power supply coil terminals A1 and A2 of the contactor K1, and thereby the main contact pins 1 and 2 of the contactor K1 are closed. The filter circuit of converter is connected with the power storage battery through the contactor K1 and the current-limiting resistor R. Now, the large-scale power load can be started. The contactor K3 and the contactor K2 form an interlock loop through the auxiliary contacts, to ensure only one of the contactors is in ON state at the same time.

Since the rectifier circuit of converter is not put into operation, there is not too much harmonic current in the micro-grid.

When the micro-grid is in an online operation state, the micro-grid has higher harmonic current tolerance capacity since it is connected to a bulk grid; at this time, a large-scale power load can be started by the variable frequency starter. Thus, the micro-grid main control system issues a control signal to the power relay board, so that the main contact pins 1 and 2 of the contactor K2 are closed, and the main contact pins 1 and 2 of the contactors K3 and K1 are opened. Now, the active power filter (APF) in the micro-grid system is put into service. The harmonic current content in the micro-grid is detected by the active power filter (APF) in real time, and the harmonic current in the micro-grid is compensated dynamically.

After the PCC switch is switched on, the micro-grid is connected to the bulk grid and operates online, and the main inverter and other inverters in the micro-grid are operating in a PQ mode and are connected ro grid as current sources. At this time, the large-scale power load may be started with the battery; however, in order to prolong the service life of the battery, the large-scale power load is directly started by the bulk grid during online operation. The photovoltaic system outputs at full power. At this moment, the contactor K2 is closed, and K1 and K3 are open; the power at the DC side of the converter is supplied from the bulk grid after rectification through a rectifier module.

To enable the battery to supply power to the DC side of the converter when the micro-grid operates offline, the voltage of the battery must be adjusted to the voltage range of the DC side of the converter when the micro-grid operates online.

The maximum voltage $U_2$ and the minimum voltage $U_1$ at the starting DC side of the variable frequency starter are set according to the protection setting of the starting DC side of the variable frequency starter and the minimum voltage required by the starting inverter side of the variable frequency starter for inversion. When the micro-grid operates online, the voltage $U_{DC}$ at the DC side of the power storage battery is detected; if $U_{DC}$ is higher than $U_2$, the power storage battery will discharge through the inverter, till $U_{DC}$ is lower than $U_2$; if $U_{DC}$ is lower than $U_2$, the power storage battery will be charged through the inverter, till $U_{DC}$ is higher than $U_1$.

Severe harmonics may occur during variable frequency startup. At this moment, the APF can be started, to compensate the harmonics in the system in real time in a closed loop compensation manner. At this time, though the harmonic current is high in the system, the harmonic current will not have impacts on the operation of the micro-grid, since the system capacity is also high.

After the PCC switch is switched off, the micro-grid is disconnected from the bulk grid and operate offline, the main inverter is operating in a VF mode as a voltage source to support the voltage and frequency in the entire micro-grid, and other inverters in the micro-grid are operating in a PQ mode and are connected to grid as current sources.

At this moment, the contactors K2 and K1 are opened, and the contactor K3 is closed firstly, to supply power from the power storage battery to the DC side of the converter; the current-limiting resistor R is used to suppress the starting current. The resistance of the current-limiting resistor R can be set according to the capacitance of the starting DC side of the variable frequency starter, usually set to tens of Ohms. After the capacitor is charged, the contactor K1 is closed, so that the current-limiting resistor R is shortened.

All of the contactors K1, K2 and K3 are controlled by the relay control board. After the contactor K2 is opened and the contactor K3 is closed, the power supply to the time relay is switched on, and the time relay is put into service. Thus, power is supplied to the contactor K1 through the contact terminal of the time relay, and the contactor K1 is closed.

To avoid a phenomenon that two power supplies supply power at the DC side of the converter at the same time, the contactor K2 and the contactors K1 and K3 must be set as interlock switches. That is to say, once the contactors K1 and K3 are closed, the contactor K2 will enter into open state; once the contactor K2 is closed, the contactors K1 and K3 will enter into open state.

The invention claimed is:

1. A system for starting a large-scale power load in a micro-grid, comprising: PCC grid-connection switch, a micro-grid AC bus, an active power filter (APF), a battery storage inverter, an energy storage battery, a current-limiting resistor R, contactors K1-K3, a time relay KT, a power relay board, a micro-grid main control system, a rectifier circuit of converter, a filter circuit of converter, and an inverter circuit of converter, wherein, the micro-grid AC bus is bi-directionally connected with a bulk grid through the PCC grid-connection switch; the active power filter (APF) is bi-directionally connected with the micro-grid AC bus;

the energy storage battery comprises two branches, wherein one branch is bi-directionally connected with the micro-grid AC bus through the battery storage inverter, and the other branch is connected to the input terminal of the filter circuit of converter through main contact pins 1 and 2 of the contactor K3 and main contact pins 1 and 2 of the contactor K1 sequentially; the current-limiting resistor R is connected in parallel with main contact pins 1 and 2 of the contactor K1;

the micro-grid AC bus is connected to the large-scale power load through the rectifier circuit of converter, main contact pins 1 and 2 of the contactor K2, the filter circuit of converter, and the inverter circuit of converter sequentially;

a first control output terminal and a second control output terminal of the micro-grid main control system are connected to a first control input terminal I1 and a second control input terminal I2 of the power relay board respectively;

a first power output terminal E1-1 of the power relay board is connected to a common output terminal E1-01 of the power relay board through power supply coil terminals A1 and A2 of the contactor K3 and normally closed auxiliary contact pins 5 and 6 of the contactor K2 sequentially;

a second power output terminal E1-2 of the power relay board is connected to the common output terminal E1-01 of the power relay board through power supply coil terminals A1 and A2 of the contactor K2, normally closed auxiliary contact pins 5 and 6 of the contactor K3, and normally closed auxiliary contact pins 5 and 6 of the contactor K1 sequentially;

a third power output terminal E1-3 of the power relay board is connected to the common output terminal E1-01 of the power relay board through power terminal pins 1 and 2 of the time relay KT and normally open auxiliary contact pins 7 and 8 of the contactor K3 sequentially;

a fourth power output terminal E1-4 of the power relay board is connected to the common output terminal E1-01 of the power relay board through power supply coil terminals A1 and A2 of the contactor K1 and normally open contact pins 3 and 4 of the time relay KT sequentially.

2. The system for starting a large-scale power load in a micro-grid according to claim 1, wherein, the power relay board comprises resistors R1-R2, photoelectric couplers OC1-OC2, relays J4-J5, DC power sources DC1-DC2, and AC power source E1;

the first input control terminal I1 of the power relay board is connected to the positive electrode pin 1 of an LED of the photoelectric coupler OC1 through the resistor R1; the negative electrode pin 2 of the LED of the photoelectric coupler OC1 is grounded; a collecting electrode pin 4 of the photoelectric coupler OC1 is connected to the positive electrode of a coil J4-1 of the relay J4, and an emitting electrode pin 3 of the photoelectric coupler OC1 is connected to the negative electrode of the coil J4-1 of the relay J4 through the DC power source DC1; a normally open stationary contact of the relay J4 is connected to the first power output terminal E1-1 of the power relay board, and a normally open moving contact of the relay J4 is connected to a terminal E1-02 of the AC power source E1;

the second input control terminal I2 of the power relay board is connected to the positive electrode pin 1 of an LED of the photoelectric coupler OC2 through the resistor R2; the negative electrode pin 2 of the LED of the photoelectric coupler OC2 is grounded; a collecting electrode pin 4 of the photoelectric coupler OC2 is connected to the positive electrode of a coil J5-1 of the relay J5, and an emitting electrode pin 3 of the photoelectric coupler OC2 is connected to the negative electrode of the coil J5-1 of the relay J5 through the DC power source DC2; a normally open stationary contact of the relay J5 is connected to the second power output terminal E1-2 of the power relay board, and a normally open moving contact of the relay J5 is connected to the terminal E1-02 of the AC power source E1;

the third power output terminal E1-3 of the power relay board and the fourth power output terminal E1-4 of the power relay board are connected to the terminal E1-02 of the AC power source E1 respectively; the terminal E1-01 of the AC power source E1 is the common output terminal E1-01 of the power relay board3.

3. The system for starting a large-scale power load in a micro-grid according to claim 2, wherein, both of the photoelectric couplers OC1-OC2 are of model TLP521-1; both of the relays J4-J5 are of model MY2NJ-12VDC.

4. The system for starting a large-scale power load in a micro-grid according to claim 1, wherein, the rectifier circuit of converter is a three-phase full-wave bridge circuit composed of rectifier diodes D1-D6.

5. The system for starting a large-scale power load in a micro-grid according to claim 4, wherein, all of the rectifier diodes D1-D6 are of model SKD110/12E.

6. The system for starting a large-scale power load in a micro-grid according to claim 1, wherein, the filter circuit of converter is a LC filter circuit composed of an inductor L and a capacitor C.

7. The system for starting a large-scale power load in a micro-grid according to claim 1, wherein, the inverter circuit of converter is a three-phase full-bridge inverter circuit composed of IGBT modules Q1-Q6 and diodes D7-D12; the power storage inverter is a three-phase full-bridge inverter circuit composed of IGBT modules Q7-Q12 and diodes D13-D18.

8. The system for starting a large-scale power load in a micro-grid according to claim 7, wherein, all of the IGBT modules Q1-Q12 are of model FS450R12KE3 from Infineon.

9. The system for starting a large-scale power load in a micro-grid according to claim 1, wherein, the time relay KT is of model JS14P from Chint; the micro-grid main control system is of model NMC1000; the PCC grid-connection switch is of model MG2312; the active power filter (APF) is of model SPA3-100A/0.4.

10. The system for starting a large-scale power load in a micro-grid according to claim 2, wherein, the time relay KT is of model JS14P from Chint; the micro-grid main control system is of model NMC1000; the PCC grid-connection switch is of model MG2312; the active power filter (APF) is of model SPA3-100A/0.4.

11. The system for starting a large-scale power load in a micro-grid according to claim 3, wherein, the time relay KT is of model JS14P from Chint; the micro-grid main control system is of model NMC1000; the PCC grid-connection switch is of model MG2312; the active power filter (APF) is of model SPA3-100A/0.4.

12. The system for starting a large-scale power load in a micro-grid according to claim 4, wherein, the time relay KT is of model JS14P from Chint; the micro-grid main control system is of model NMC1000; the PCC grid-connection switch is of model MG2312; the active power filter (APF) is of model SPA3-100A/0.4.

13. The system for starting a large-scale power load in a micro-grid according to claim 5, wherein, the time relay KT is of model JS14P from Chint; the micro-grid main control system is of model NMC1000; the PCC grid-connection switch is of model MG2312; the active power filter (APF) is of model SPA3-100A/0.4.

14. The system for starting a large-scale power load in a micro-grid according to claim 6, wherein, the time relay KT is of model JS14P from Chint; the micro-grid main control system is of model NMC1000; the PCC grid-connection switch is of model MG2312; the active power filter (APF) is of model SPA3-100A/0.4.

15. The system for starting a large-scale power load in a micro-grid according to claim 7, wherein, the time relay KT is of model JS14P from Chint; the micro-grid main control system is of model NMC1000; the PCC grid-connection switch is of model MG2312; the active power filter (APF) is of model SPA3-100A/0.4.

16. The system for starting a large-scale power load in a micro-grid according to claim 8, wherein, the time relay KT is of model JS14P from Chint; the micro-grid main control system is of model NMC1000; the PCC grid-connection switch is of model MG2312; the active power filter (APF) is of model SPA3-100A/0.4.

* * * * *